(12) United States Patent
Teaford et al.

(10) Patent No.: US 7,979,160 B2
(45) Date of Patent: Jul. 12, 2011

(54) SYSTEM AND METHOD FOR ROBOTIC ACCURACY IMPROVEMENT

(75) Inventors: Kris K Teaford, Peabody, KS (US); Curtis A. Richardson, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 427 days.

(21) Appl. No.: 12/183,900

(22) Filed: Jul. 31, 2008

(65) Prior Publication Data

US 2009/0037022 A1 Feb. 5, 2009

Related U.S. Application Data

(60) Provisional application No. 60/952,907, filed on Jul. 31, 2007.

(51) Int. Cl.
*G06F 19/00* (2006.01)
*B25J 19/00* (2006.01)
*B25J 19/02* (2006.01)

(52) U.S. Cl. ............... 700/254; 700/258; 318/568.16; 901/9; 901/46

(58) Field of Classification Search ............... 318/568.1, 318/568.11, 568.16, 568.22, 568.24; 700/253, 700/254, 279, 302, 900; 702/105, 150–154; 901/2, 9, 15, 25, 27–29, 46
See application file for complete search history.

(56) References Cited

U.S. PATENT DOCUMENTS

| | | | |
|---|---|---|---|
| 3,845,284 A * | 10/1974 | Taguchi et al. | 318/567 |
| 4,542,794 A * | 9/1985 | Bjor | 173/1 |
| 4,570,065 A | 2/1986 | Pryor | |
| 4,579,380 A | 4/1986 | Zaremsky et al. | |
| 4,604,716 A * | 8/1986 | Kato et al. | 700/251 |
| 4,819,184 A * | 4/1989 | Jonsson et al. | 700/261 |
| 4,825,135 A | 4/1989 | Perez | |
| 4,857,816 A | 8/1989 | Rogozinski et al. | |

(Continued)

FOREIGN PATENT DOCUMENTS

EP 742503 A2 8/2000

(Continued)

OTHER PUBLICATIONS

Wollnack, Precision Increase of Industrial Robots, May 2001, Second Asian Symposium on Industrial Automation and Robotics, pp. 1-9.*

(Continued)

*Primary Examiner* — Thomas G Black
*Assistant Examiner* — Lindsay M Browder
(74) *Attorney, Agent, or Firm* — Hovey Williams LLP (57) ABSTRACT

A system and method for sensing and compensating for unintended joint movement of a robotic arm caused by application of a load. The system may have a plurality of external encoders each in intimate contact with an external edge portion of one of a plurality of robotic arm joints to sense joint movement caused by application of the load, and a computing device configured for calculating a compensation amount based on the sensed joint movement and sending the calculated compensation amount to a corresponding robot motor encoder to correct the position of the joint by the compensation amount. The method may comprise applying the load one portion at a time, such that a portion of the load is applied, the compensation amount is calculated, the position of the joint is corrected, and then the process repeats, with another portion of the load applied to the robotic arm.

4 Claims, 5 Drawing Sheets

U.S. PATENT DOCUMENTS

| | | | |
|---|---|---|---|
| 4,891,764 A | | 1/1990 | McIntosh |
| 5,049,797 A | | 9/1991 | Phillips |
| 5,129,044 A | * | 7/1992 | Kashiwagi et al. ........... 700/251 |
| 5,418,441 A | | 5/1995 | Furukawa |
| 6,069,463 A | * | 5/2000 | Umeda et al. ............ 318/568.22 |
| 6,394,189 B1 | * | 5/2002 | Moon et al. ........................ 173/1 |
| 6,529,852 B2 | | 3/2003 | Knoll et al. |
| 6,650,078 B1 | * | 11/2003 | Chaffee ......................... 318/630 |
| 6,919,701 B2 | * | 7/2005 | Nagata et al. ............ 318/568.12 |
| 6,995,536 B2 | * | 2/2006 | Challoner ................ 318/568.21 |
| 2003/0127635 A1 | | 7/2003 | Morse et al. |
| 2004/0069865 A1 | * | 4/2004 | Rowe et al. ................... 239/146 |
| 2004/0263102 A1 | * | 12/2004 | Kraus et al. ................... 318/432 |
| 2005/0150123 A1 | | 7/2005 | Eaton |
| 2005/0166413 A1 | | 8/2005 | Crampton |
| 2006/0161299 A1 | | 7/2006 | Cho et al. |
| 2006/0177295 A1 | | 8/2006 | Frueh et al. |

FOREIGN PATENT DOCUMENTS

| | | | |
|---|---|---|---|
| JP | 62245306 | * | 10/1987 |
| JP | 6083453 | * | 3/1994 |

OTHER PUBLICATIONS

Seals, Position Feedback Control with a 'Smart' Controller Based on an FPGA, Jan. 1994, IEE Colloquium on Stepper Motors and Their Control, pp. 6/1-6/3.*

NERAC Search Results; Mar. 27, 2007.

Computing and Control: A new robotic system for the operating theatre; By: A. Malvisi, M. Fadda, R. Valleggi, G. Bioli, S. Martelli; Aug. 24, 2001.

* cited by examiner

SYSTEM AND METHOD FOR ROBOTIC ACCURACY IMPROVEMENT

RELATED APPLICATIONS

This nonprovisional patent application claims priority benefit, with regard to all common subject matter, of earlier-filed U.S. provisional patent application titled "Robotic Accuracy Improvement System", Ser. No. 60/952,907, filed Jul. 31, 2007, hereby incorporated by reference in its entirety into the present application.

BACKGROUND

1. Field

The present invention relates to a system and method for sensing and compensating for unintended joint movement of a robotic arm caused by application of a load. More particularly, the present invention relates to a system having external encoders in physical communication with robotic arm joints to sense joint movement and a computing device for calculating a compensation amount based on the sensed joint movement and sending the calculated compensation amount to a robot motor encoder to correct the position of the joint.

2. Related Art

Articulated robots have a plurality of rotary joints and are typically powered by electric motors. One common example of an articulated robot is a 6-axis articulated arm robot. A 6-axis articulated arm robot may have a base at one end, which may be rotatably attached at the first axis or joint, and an end effector on the other end, which may be rotatably attached at the sixth axis or joint. The end effector may be any attachment required for a particular automated application. For example, in a drilling system for an upper cab of an aircraft, the end effector may be a nosepiece for drilling a particular part.

In various applications, a load may be applied to the end effector. For example, in the upper cab drilling system, the applied load is a clamp-up or drilling force. Specifically, a pneumatic pressure foot may apply pressure and clamp up against a part that is to be drilled. The robot arm is intended to hold its position during this clamp-up phase, but as pressure is applied to the part, there is a reactive force against the robot arm, which can unintentionally move the robot arm slightly. This slight movement can cause nosepiece skidding, unintentionally moving the nosepiece off of its desired mark.

Robot motor encoders are encoders which are communicably coupled with a computing device to receive motion commands for actuating a motor of one of the joints of the robotic arm. Robot motor encoders may sense motion of the robot motor. However, the robot motor encoders can not monitor the actual joint motion. For example, even if a shaft of the motor does not move, an external edge portion of the joint may still move some, due to elasticity and other issues which the motor encoder can not sense. Since the robot motor encoders do not sense this external joint movement, they can not be accurately used to determine when a movement of the motor is required to correct the joint position.

Accordingly, there is a need for a system and method for maintaining or correcting the position of a robot arm when a load is applied to the robot arm that does not suffer from the problems and limitations of the prior art.

SUMMARY

The present invention provides a system and method for sensing and compensating for unintended joint movement of a robotic arm caused by application of a load on the robotic arm. The robotic arm may comprise a plurality of sections linked by a plurality of joints, each rotatable about one of a plurality of axes. The joints may each be actuated by one of a plurality of robot motor encoders.

A system constructed in accordance with an embodiment of the invention may comprise a plurality of external encoders adapted for sensing movement of at least one of the plurality of joints. Furthermore, the system may comprise a computing device configured for calculating at least one compensation amount based on data output by the external encoders. Additionally, the computing device may send the calculated compensation amount to at least one of the robot motor encoders to correct the position of the corresponding joints by the compensation amount.

For example, a first external encoder may be positioned in intimate physical contact with an external edge portion of a first joint such that when the first joint rotates or pivots, a wheel portion of the external encoder rotates or pivots by a corresponding number of counts or pulses. The amount by which the wheel portion rotates or pivots may be read by the computing device, which may calculate the compensation amount that the corresponding robot motor encoder must move in order to return the joint to its initial position.

A method in accordance with an embodiment of the invention may comprise the steps of applying a load one portion at a time, and correcting the position of at least one of the joints following each application of a portion of the load. Specifically, the method may include applying a portion of the load to an end effector of the robotic arm, using the amount of movement of the external encoder and a conversion factor to calculate the compensation amount, moving the joint by the compensation amount, and then repeating the process with the next portion of the load applied to the robotic arm. This process may be repeated until the total load is applied to the end effector of the robotic arm.

These and other important aspects of the present invention are described more fully in the detailed description below.

BRIEF DESCRIPTION OF THE DRAWINGS

Embodiments of the present invention are described in detail below with reference to the attached drawing figures, wherein.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
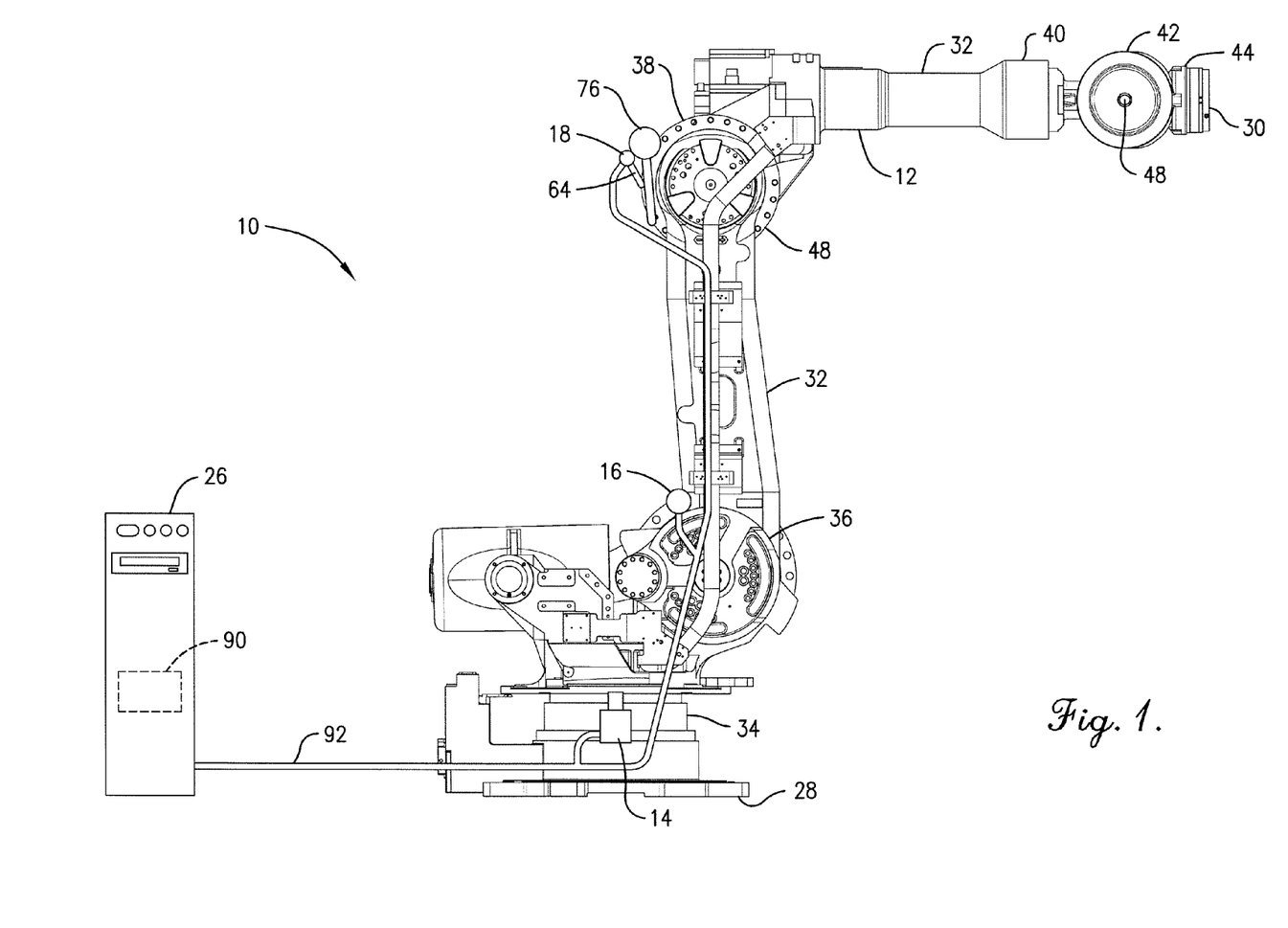
FIG. 1 is a schematic drawing of a robotic accuracy improvement system constructed in accordance with an embodiment of the present invention and attached to a robotic arm.
Figures 2, 3:
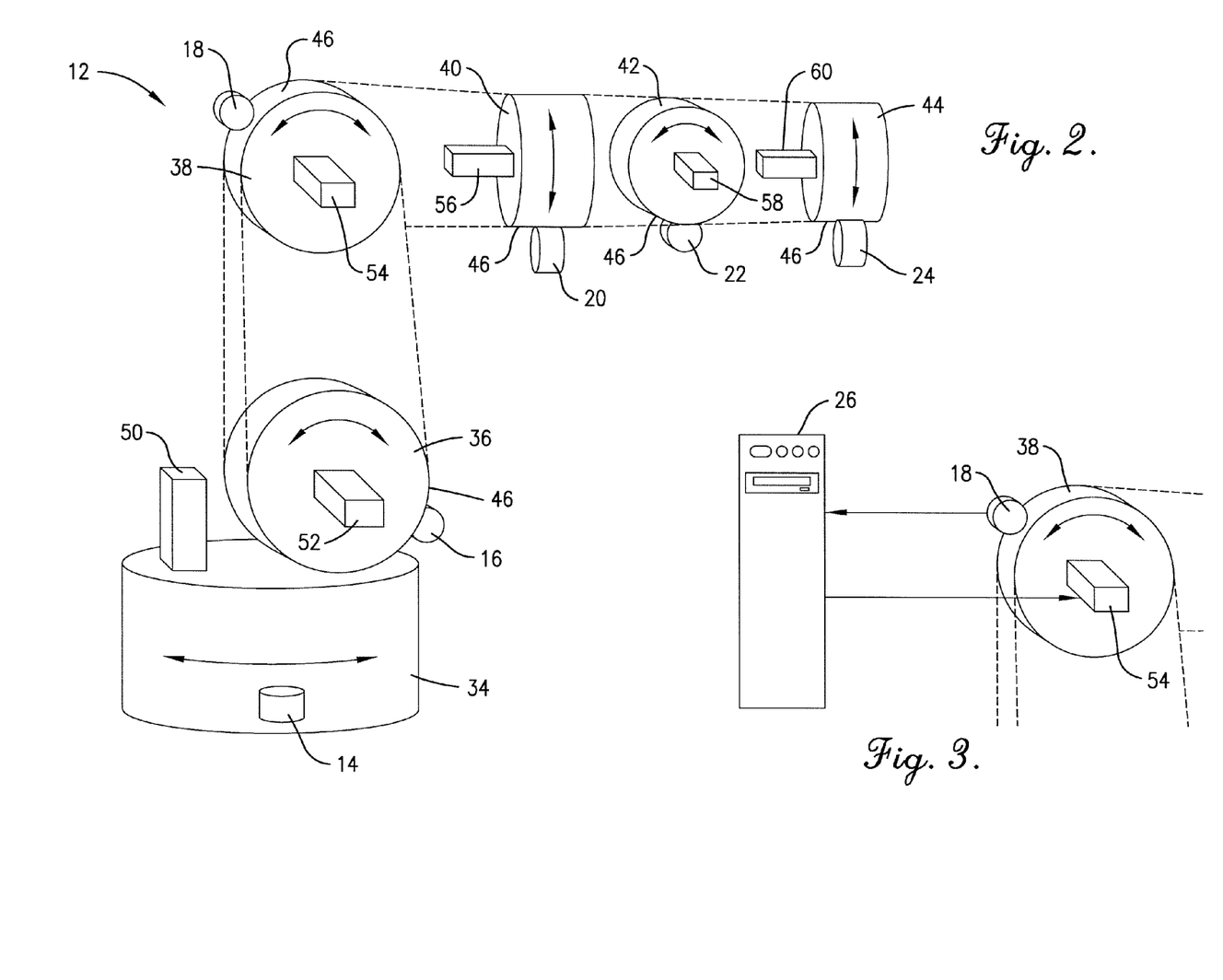
FIG. 2 is a schematic drawing of a plurality of joints of the robotic arm in intimate physical contact with a plurality of external encoders of the robotic accuracy improvement system of FIG. 1.
FIG. 3 is a schematic drawing illustrating the flow of data from one of the external encoders of FIG. 2 to a computing device of the robotic accuracy improvement system and from the computing device to a robot motor encoder of the robotic arm.

FIGS. 1-3 illustrate a robotic accuracy improvement system 10 for sensing and compensating for unintended joint movement of a robotic arm 12 caused by application of a load. The robotic accuracy improvement system 10 constructed in accordance with an embodiment of the invention may comprise a plurality of external encoders 14,16,18,20,22,24 for measuring movement of the robotic arm 12 and a computing device 26 communicably coupled with the external encoders 14-24 and the robotic arm 12.

The robotic arm 12 may have a plurality of sections 28-32, including a base 28, an end effector 30, and one or more intermediate sections 32, linked in series to one another by a plurality of joints 34,36,38,40,42,44. Each of the joints 34-44 may be a rotary joint having an exposed external edge portion 46 and movable about one of a plurality of axes 48 of the robotic arm 12. Furthermore, the robotic arm 12 may comprise a plurality of robot motor encoders 50-60, each coupled with one of the joints 34-44 for actuating pivotal and/or rotatory motion of at least one section of the robotic arm 12 about one of the axes 48. The robotic arm may be a 6-axis articulated arm robot, or alternatively may be any robotic apparatus having any number of axes and any geometry requiring accurate positioning under applied loads and weights. For example, the robotic arm 12 may be part of an upper cab drilling system, and the end effector 30 may be a nosepiece to which pressure is applied during clamping of the nosepiece against the part to be drilled.

The external encoders 14-24 may be any sensing or measuring device for sensing the movement of one of the joints 34-44. For example, each of the external encoders 14-24 may be disposed in intimate physical contact with the external edge portion 46 of one of the joints 34-44 of the robotic arm 12. In various embodiments of the invention, rotary or pivotal motion of one of the joints 34-44 may cause physical rotational motion of a corresponding one of the external encoders 50-60. The external encoders 50-60 may convert rotary motion into data signals and may send the data signals to the computing device 26 via fiber or electrical lines 62 or wirelessly through any transceiver (not shown) known in the art.

The external encoders 14-24 may be incremental rotary encoders, absolute rotary encoders, or other encoders operable to detect the motion of a joint. The external encoders 14-24 may be rotary encoders that have a known number of counts or pulses output per each revolution, such that the amount by which it has rotated can be measured by a device receiving the pulses, such as the computing device 26. For example, the external encoders 14-24 may have a resolution of 30,000 counts or pulses per revolution.

In various embodiments of the invention, the external encoders 14-24 may be absolute encoders that are read relatively. For example, an initial position of at least one of the external encoders 14-24 may be obtained by the computing device 26 prior to application of a load on the robotic arm 12. Then, following the application of the load or a fraction of the load on the robotic arm 12, another position may be obtained from the same one of the external encoders 14-24 by the computing device 26 and compared to the initial position to determine the amount of movement from its initial position.

Each of the external encoders 14-24 may be attached to the robotic arm 12 in one of a variety of ways. Preferably, each of the external encoders 14-24 are attached to one of the sections 28-32 of the robotic arm 12 such that it is in physical communication or intimate physical contact with the external edge portion 46 of one of the joints 34-44 to sense motion of one of the joints 34-44, such as a pivotal or rotary motion by one or more of the robot sections 28-32 attached at one of the joints 34-44.

Figures 4, 5:
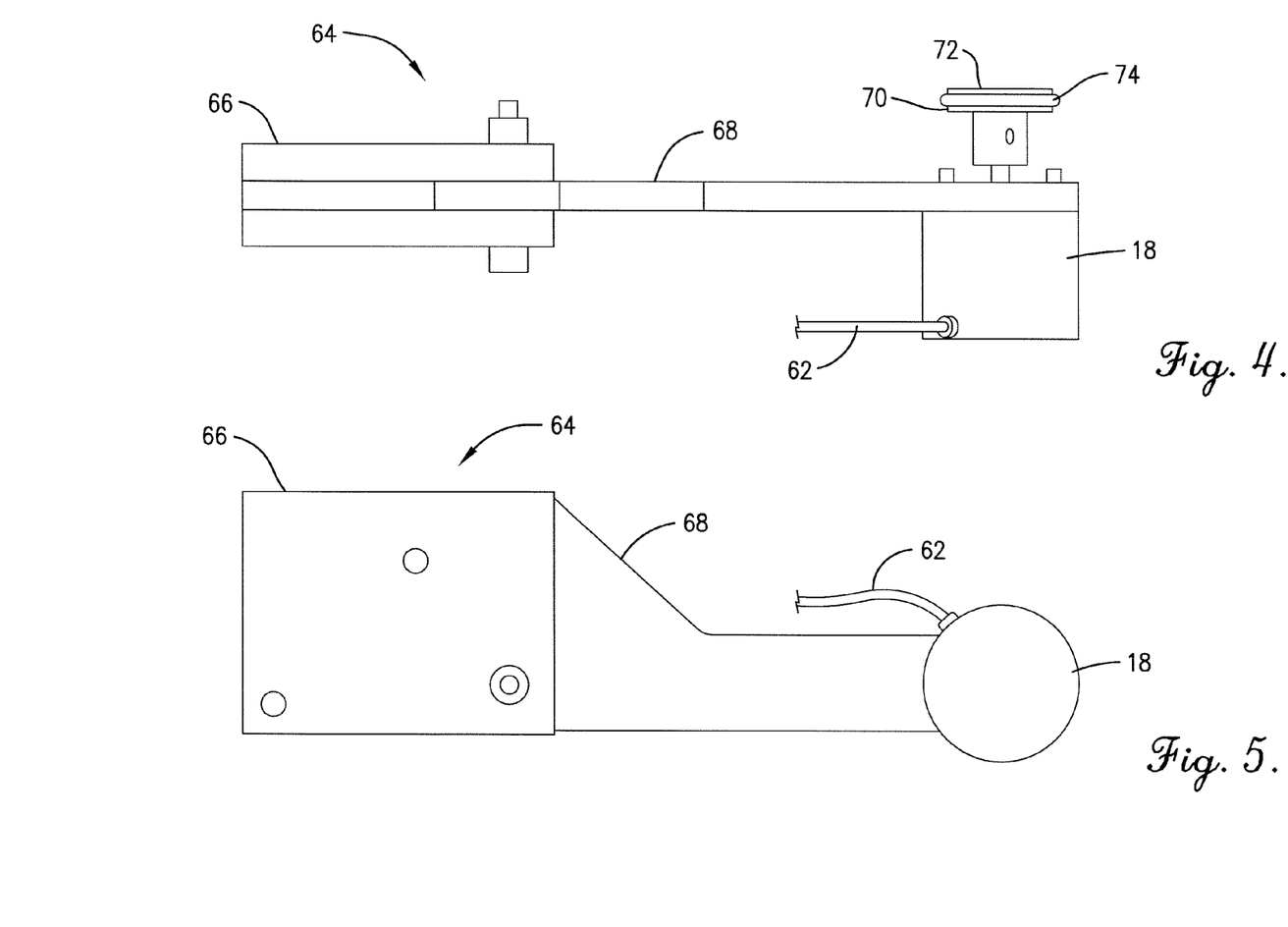
FIG. 4 is a side view of an attachment apparatus for attaching one of the external encoders of FIG. 2 to the robotic arm.
FIG. 5 is a top plan view of the attachment apparatus of FIG. 4.

For example, as illustrated in FIGS. 4-5, an attachment apparatus 64 may comprise a block assembly 66 for stationary attachment to one of the robotic arm sections 28-32 and an external encoder arm assembly 68 fixed to or integral with the block assembly 66 and configured to hold a circumferential edge 70 of a wheel portion 72 of one of the external encoders 14-24 against the external portion 46 of one of the joints 34-44. For exemplary purposes, external encoder 18 is illustrated in FIGS. 4-7. However, each external encoder 14-24 may be attached in a similar or identical manner to the robotic arm 12.

Turning again to FIGS. 4-5, a rubber fitting 74 may be attached at the circumferential edge 70 of the wheel portion 72 of the external encoder 18 in order to create friction between the joint 38 and the wheel portion 72 of the external encoder 18, so that the wheel portion 72 may rotate when the corresponding joint 38 rotates. Alternatively, the wheel portion 72 may engage the joint 38 physically by other means, such as by way of gear assemblies or other methods known in the art for a rotating element to actuate the rotation of another rotatable element.

Figure 6:
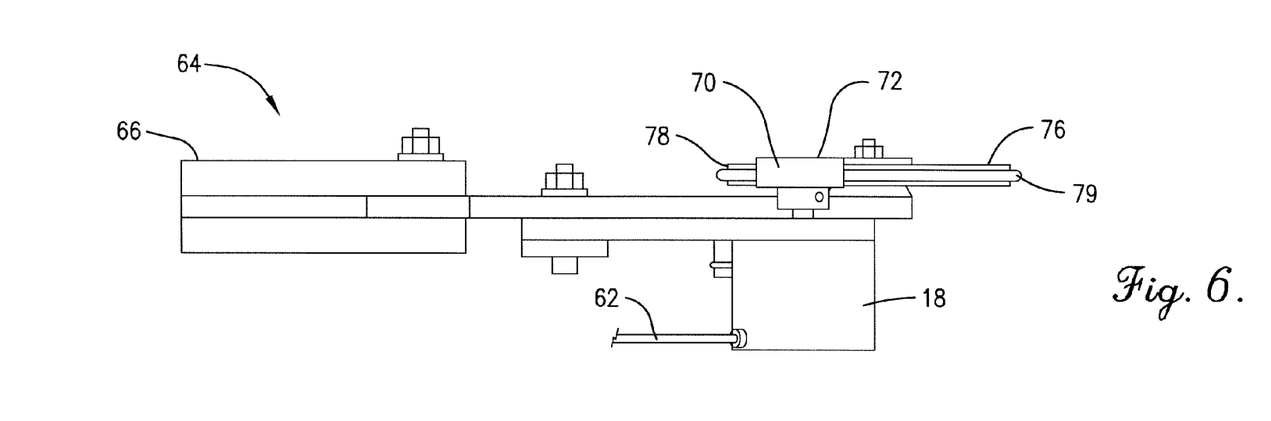
FIG. 6 is a side view of the attachment apparatus of FIG. 4, further comprising an intermediate wheel.
Figure 7:
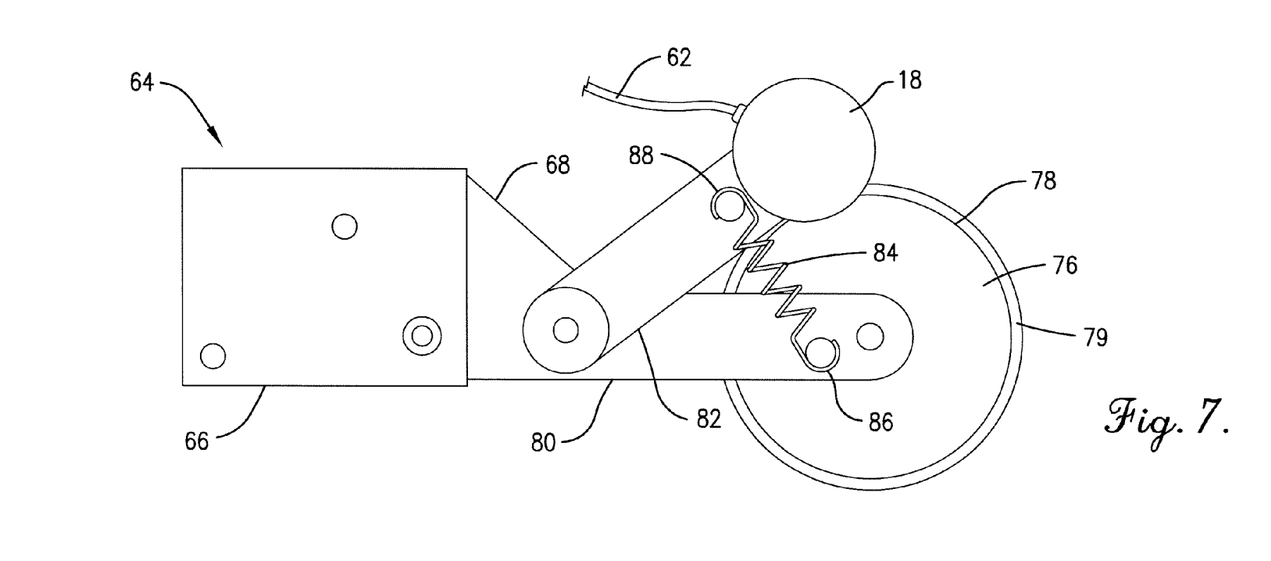
FIG. 7 is a top plan view of the attachment apparatus of FIG. 6.

In other embodiments of the invention, as illustrated in FIGS. 6-7, the attachment apparatus 64 may additionally comprise an intermediate wheel 76 having a circumferential edge 78 and an optional rubber fitting 79 which are held in intimate physical contact with the joint 38 and is also held in intimate physical contact with the circumferential edge 70 of the wheel portion 72 of the external encoder 18. In this embodiment of the invention, the external encoder arm assembly 68 may comprise a first arm 80 directly attached or integral with the block assembly 66 and rotatably attached to the intermediate wheel 76, and a second arm 82 fixedly or rotatably attached to the first arm 80 and rotatably attached to the wheel portion 72 of the external encoder 18. If the second arm 82 is rotatably attached to the first arm 80, a spring 84 may be attached to the first arm 80 at a first end 86 of the spring 84 and to the second arm 82 at a second end 88 of the spring 84, biasing the wheel portion 72 of the external encoder 18 against the intermediate wheel 76.

The intermediate wheel 76 in FIGS. 6-7 may be utilized in a gear reduction-type manner, such that the intermediate wheel 76 may serve to match the resolution of the external encoder 18 to the resolution of the corresponding robot motor encoder 54 as closely as possible. This may reduce or eliminate any conversion computations required by the computing device 26, as described herein.

In various embodiments of the invention, the external encoders 14-24 may comprise only one external encoder 18, as illustrated in FIGS. 3-7, in intimate physical contact with one of the plurality of joints 34-44. In other various embodiments of the invention, the external encoders 14-24 may comprise a plurality of external encoders 14-24, each in intimate physical contact with one of the plurality of joints 34-44. For example, a first external encoder 14 may be in intimate physical contact with a first joint 34, a second external encoder 16 may be in intimate physical contact with a second joint 36, and a third external encoder 18 may be in intimate physical contact with a third joint 38, while the remaining joints 40-44, such as a fourth joint 40, a fifth joint 42, and a sixth joint 44, may be without physical contact with any of the external encoders 14-24, as illustrated in FIG. 1. Alternatively, each of the joints 34-44 of the robotic arm 12 may be in intimate physical contact with one of the external encoders 14-24, such that unintentional movement of each of the joints 34-44 may be measured, as in FIG. 2.

The computing device 26 may include any number of processors, controllers, integrated circuits, programmable logic devices, or other computing devices and resident or external memory for storing data and other information accessed and/or generated by the external encoders 14-24, robot motor encoders 50-60, and any other sensing, measuring, or actuating devices integral with the robotic accuracy improvement system 10 or the robotic arm 12. The computing device 26 may be a stand-alone computing device in communication with another computing device controlling the robotic arm 12, or the computing device 26 may be integral with the computing device controlling the robotic arm 12. The computing device 26 is preferably coupled with the external encoders 14-24, the robot motor encoders 50-60, a memory 90, and other components through wired or wireless connections, such as communications line 92, to enable information to be exchanged between the various components.

The computing device 26 may implement a computer program and/or code segments to perform the functions described herein. The computer program preferably comprises an ordered listing of executable instructions for implementing logical functions in the computing device. The computer program can be embodied in any computer-readable medium for use by or in connection with an instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The memory 90 may be integral with the computing device, stand-alone memory, or a combination of both. The memory 90 may include, for example, removable and non-removable memory elements such as RAM, ROM, flash, magnetic, optical, USB memory devices, and/or other conventional memory elements.

The memory 90 may store various data associated with operation of the system 10, such as the computer program and code segments mentioned above, or other data for instructing the computing device and system elements to perform the steps described herein. Further, the memory 90 may store initial position values of the external encoders 14-24, conversion factors, external encoder and robot motor encoder identification and resolution data, etc. for later retrieval by the computing device 26. The various data stored within the memory 90 may be associated within one or more databases to facilitate retrieval of the information.

The computing device 26, external encoders 14-24, and robot motor encoders 50-60 described herein need not be physically connected to one another since wireless communication among the various depicted components is permissible and intended to fall within the scope of the present invention.

Figure 8:
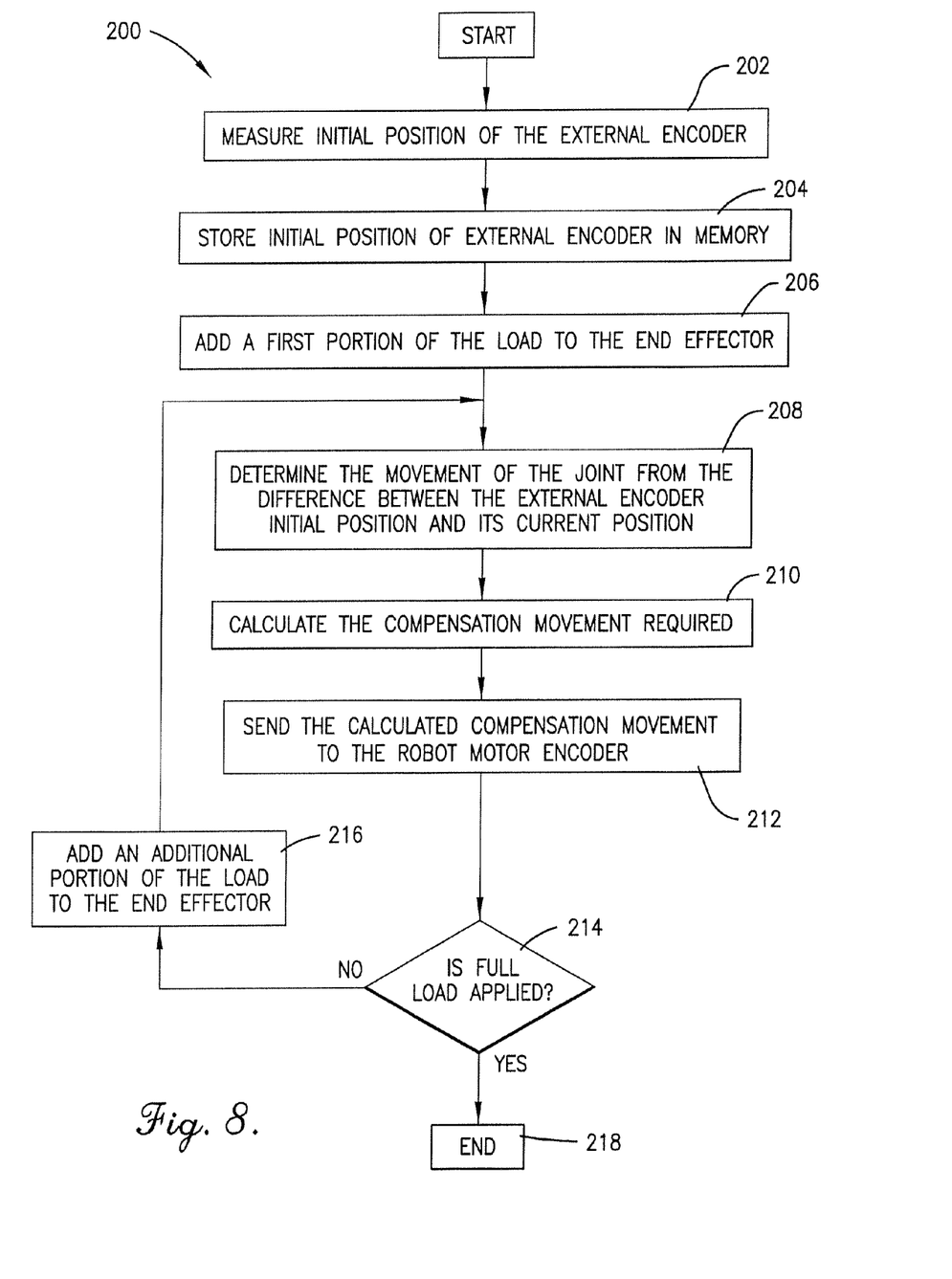
FIG. 8 is a flow chart of a method for achieving robotic accuracy improvement using the robotic accuracy improvement system of FIG. 1.

In operation, the following method steps may be performed for only one of the external encoders 14-24 at one of the joints 34-44 or may be performed substantially simultaneously for each of the plurality of external encoders 14-24 at one or more of the plurality of joints 34-44. However, for exemplary purposes, FIG. 3 illustrates the exchange of data between one of the external encoders 18, the computing device 26, and the corresponding robot motor encoder 54. Additionally, the method steps of FIG. 8 illustrates the method according to an embodiment of the invention using only one of the external encoders 14-24 at one of the joints 34-44. However, this should not be taken in a limiting sense, noting that each of the external encoders 14-24 at each of the joints 34-44 may be used in a substantially identical manner.

As illustrated in FIG. 3, the external encoder 18 may send a data signal to the computing device 26 corresponding to an amount by which the joint 38 has moved or rotated about its axis. Then the computing device 26 may compute a compensation amount by which the robot motor encoder 54 must rotate the joint 38 to compensate for the amount by which the joint 38 has moved or rotated about its axis during application of a load or weight to the end effector 30 of the robotic arm 12.

The compensation amount may be directly related to the amount by which the wheel portion 72 of the external encoder 18 has moved if the resolution (number of counts per revolution) of the external encoder 18 matches the resolution of the robot motor encoder 54. If this is not the case, the intermediate wheel 76 may be used in the attachment apparatus 64 as described above, and may be manufactured with an appropriate circumference to match the resolution of the wheel portion 72 of the external encoder 18 with the resolution of the robot motor encoder 54. However, in other embodiments of the invention where the resolution of the external encoder 18 may not match the resolution of the robot motor encoder 54, the computing device 26 may use a conversion factor k to determine the compensation amount.

For example, the compensation amount may be equal to the number of pulses or counts that the external encoder 18 has rotated (relative to the initial position of the external encoder 18) multiplied by the conversion factor k. The conversion factor k may be the number of robot motor encoder counts or pulses per revolution divided by the number of external encoder counts or pulses per revolution. So the following equations may be used by the computing device 26 to calculate the compensation amount:

$$\text{compensation amount} = k*(\text{external encoder pulses read from initial position})$$

Where: k=(# robot motor encoder counts)/(# external encoder pulses) per revolution The compensation amount may be calculated each time a movement is sensed, or preferably may be calculated following each occurrence of the load or a portion of the load being applied to the robotic arm 12, as in method 200, illustrated in FIG. 8. For example, the method 200 may begin with the step of measuring the initial position of the external encoder 18, as depicted in step 202. The initial position is the position of the external encoder 18 prior to any weight or load being applied to the robotic arm 12. For example, the robotic arm 12 may be initially placed in a configuration and position for drilling a part, such that the end effector 30 is aligned with a precise point on the part to be drilled. Subsequently, the computing device 26 may be commanded to obtain the initial position of the external encoder 18. Then, as depicted in step 204, the computing device 26 may store the initial position of the external encoder 18 in the memory 90.

Next, as depicted in step 206, at least a first portion of the load may be added to the end effector 30. In various embodiments of the invention, as depicted in FIG. 8, the total load is not applied all at once. Instead, it is applied in steps, one portion at a time, so that small corrections may be made to the joint 38 position after each portion of the load is applied. This method can, for example, reduce or eliminate nosepiece skid and improve the end effector 30 position and attitude accuracy better than applying the position/attitude corrections after the total load is applied, which can result in larger amounts of nosepiece skid.

The first portion of the load added to the end effector 30 may be any percentage of the load as desired for a given application. For example, a load of 300 lbs may be applied to the end effector in 100 lb increments, such that the first portion of the load is 100 lbs, and two more additional portions of the load are each 100 lbs. The load may be weight added to the end effector 30 or pressure loaded against an end effector 30. For example, the load may be a clamp-up force applied to the nosepiece of an upper cab drilling system.

Next, the computing device 26 may read the position of the external encoder 18 and determine how much the external encoder 18 moved from the initial position, as depicted in step 208. As described above, the external encoder 18 moves when the joint 38 moves, and typically the joint 38 will move by a small amount when pressure is applied to the end effector 30 of the robotic arm 12 due to a reactionary force. Therefore, the computing device 26 may calculate the compensation amount by which the robot motor encoder 54 must move to compensate for this undesired movement of the joint 38, as depicted in step 210. As described above, this compensation amount may be directly proportional to the amount by which the external encoder 18 moved, or a conversion factor, which may be stored in the memory 90, may be used to determine the compensation amount.

Then the computing device 26 may send the compensation amount to the robot motor encoder 54, as depicted in step 212, such that the robot motor encoder 54 may actuate the joint 38 to move by the compensation amount, thereby moving the joint 38 and the external encoder 18 back to their initial positions.

Next, as depicted in step 214, the computing device 26 may determine if the full load has been applied. Alternatively, a user may send an end command to the computing device 26 if the full load has been applied. If the full load has not been applied, then an additional portion of the load may be added to the end effector 30, as depicted in step 216. Following step 216, steps 208 through 214 may be repeated until the computing device 26 senses or is commanded that the full load has been applied, and ends the method 200, as depicted in step 218.

Although the invention has been described with reference to the embodiments illustrated in the attached drawings, it is noted that equivalents may be employed and substitutions made herein without departing from the scope of the invention as recited in the claims. For example, as stated above, the method 200 may be applied to the plurality of external encoders 14-24 simultaneously during the process of loading the end effector 30.

Having thus described an embodiment of the invention, what is claimed as new and desired to be protected by Letters Patent includes the following:

1. A system for sensing and correcting unintended movement of a first joint of a robotic arm, wherein the robotic arm comprises a plurality of sections including an end effector, a plurality of joints at which the plurality of sections interconnect with each other, and a plurality of robot motor encoders, each for actuating physical movement of at least one of the sections of the robotic arm at one of the joints, wherein the first joint is coupled to a first robot motor encoder for actuating physical movement of the first joint, the system comprising:

a first external encoder in intimate physical contact with an external portion of the first joint and configured to sense pivotal movement of the first joint and to transmit a first data signal corresponding to an amount of pivotal movement sensed by the first external encoder;

a computing device configured for:
 receiving the first data signal from the first external encoder,
 determining a first compensation amount corresponding to the amount of pivotal movement sensed by the first external encoder, and
 communicating the first compensation amount to the first robot motor encoder to actuate the first joint by an amount corresponding to the first compensation amount; and an attachment apparatus configured to hold an intermediate wheel in intimate contact with the first joint on one side of the intermediate wheel and in intimate contact with the first external encoder on another side of the intermediate wheel, creating a gear reduction between the first external encoder and the first robot motor encoder, the attachment apparatus further comprising:
 a first arm rotatably attached to the intermediate wheel and fixedly attached to one of the plurality of sections of the robotic arm; and
 a second arm rotatably attached to the first arm and rotatably attached to the first external encoder, the second arm being configured to bias a wheel portion of the first encoder against the intermediate wheel.

2. The system of claim 1, wherein the amount of pivotal movement sensed by the first external encoder is relative to an initial position value obtained prior to an application of a load on the robotic arm.

3. The system of claim 1, wherein the second arm biases the first encoder against the intermediate wheel using a spring attached to the first arm and the second arm.

4. The system of claim 1, further comprising:

a second external encoder in intimate physical contact with an external portion of a second joint and configured to sense pivotal movement of the second joint and to transmit a second data signal corresponding to an amount of pivotal movement sensed by the second external encoder, wherein the computing device is configured for:
  receiving the second data signal from the second external encoder,
  determining a second compensation amount corresponding to the amount of pivotal movement sensed by the second external encoder, and
  communicating the second compensation amount to the second robot motor encoder to actuate the second joint by an amount corresponding to the second compensation amount.

* * * * *